(No Model.)
J. D. McGEE.
TIRE SHRINKER.
No. 381,939. Patented May 1, 1888.
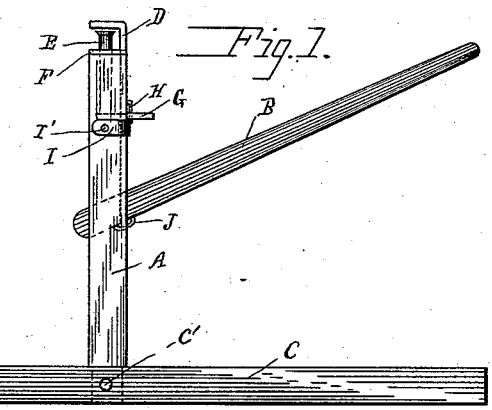
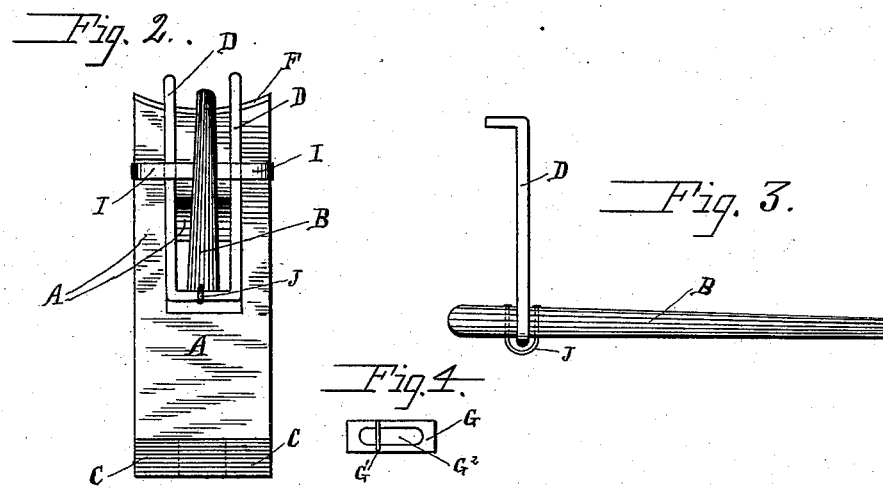
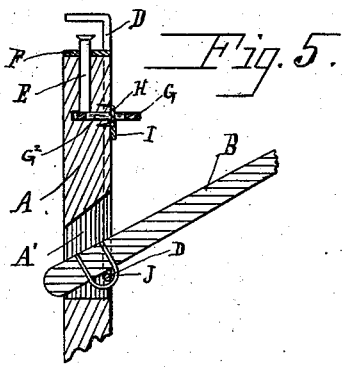
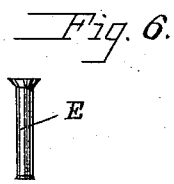
Witnesses.
R. A. Balderson.
F. C. Killigan.
Inventor,
Joseph D. McGee
By L. Bingham
His Attorney

UNITED STATES PATENT OFFICE.

JOSEPH DANLY McGEE, OF CHIPLEY, GEORGIA.

TIRE-SHRINKER.

SPECIFICATION forming part of Letters Patent No. 381,939, dated May 1, 1888.

Application filed September 17, 1887. Serial No. 249,982. (No model.)

*To all whom it may concern:*

Be it known that I, JOSEPH DANLY McGEE, a citizen of the United States of America, residing at Chipley, in the county of Harris and State of Georgia, have invented certain new and useful Improvements in Tire-Shrinkers, of which the following is a specification, reference being had therein to the accompanying drawings.

My invention relates to tire-shrinkers; and its objects are, first, to provide a portable device for shrinking a tire mechanically; second, to secure the tightening of the tire invariably; third, to effect the operation easily, and, fourth, to accomplish these ends with structural simplicity and economy. I attain these purposes by the device illustrated in the accompanying drawings, in which—

Figure 1 represents a side elevation of a tire-shrinker embodying the essential elements of my invention. Fig. 2 is a central longitudinal section of the same. Fig. 3 is a detail view of the manipulating-lever and its connecting-rod, whereby the reciprocation of the tire-grasping device is procured. Fig. 4 is a detail view of the slotted plate wherein the pin shown in Fig. 6 is held when the tire is to be hammered and a flush surface therefor is rendered necessary, and on the rear face of which it is supported when the tire is to be bent by the grasping device; and Fig. 5 shows a detail sectional view of the grasping device.

The same designations indicate corresponding parts in the several views.

In the various pursuits of life, more especially in agricultural localities, it becomes frequently necessary to remedy the looseness of a tire on the wheel it encircles, and a blacksmith is not always obtainable without considerable outlay of time and money. It has also been demonstrated that on such occasions the application of heat is not vitally necessary, and that the desired end can equally well be effected by cold mechanical agencies. If, therefore, a farmer or wagoner is provided with a portable device not easily injured and of easy construction, he could tighten the tire of his wagon as quickly and wherever the looseness is discovered. To bring such a machine within the marketable reach of everybody is the aim of my invention.

In a base, C, is stepped an upright, A, held therein by a suitable pin, C'. Centrally this upright has a perforation, A', horizontal at the bottom and angular at the top, within which the lever B is loosely held by a clip, J, on the under surface of said lever, which spans the base of the U-shaped grasping-arms D. A slotted plate, G, having a cross-piece, G', to divide the same, is inserted about midway between the perforation A' and the top of the upright A, being secured thereto by a staple, H. The pin E is alternately held within either of the divisions of the slot in the plate G and on the rear edge thereof, according as the tire is either to be bent or hammered. In the former case the pin E is pulled up simultaneously with the plate G, being pulled out until the pin rests on the rear flange of the plate. The tire is then lifted so as to rest on the pin. Then the lever B is raised so that the arms D will grasp the tire. Then the lever is depressed, thereby necessarily pulling the tire down with it until it rests on the curved surface F of the upright, except that portion immediately adjacent to the pin, which will consequently become bent. Then the plate G is pushed backward until the pin falls in the rear division of the slot in the plate G. The bent portion is thereupon hammered on the surface F, resulting in a considerable shrinkage of the tire. A brace, I, is nailed to the sides of the upright A, so as to guide the reciprocations of the arms D.

Having thus fully described my improvements, what I claim, and desire to secure by Letters Patent of the United States, is—

The base C, having upright A, in combination with the grasping-arms D, the actuating-lever B, the pin E, and the slotted plate G, the whole co-operating as herein shown and described.

In testimony whereof I affix my signature in presence of two witnesses.

JOSEPH DANLY McGEE.

Witnesses:
T. L. THOMASON,
R. O. BULLOCH.